United States Patent
Koç et al.

(10) Patent No.: US 7,174,015 B1
(45) Date of Patent: Feb. 6, 2007

(54) METHODS AND APPARATUS FOR VARIABLE RADIX SCALABLE MODULAR MULTIPLICATION

(75) Inventors: Cetin K. Koç, Corvallis, OR (US); Alexandre F. Tenca, Corvallis, OR (US); Georgi Todorov, Corvallis, OR (US)

(73) Assignee: State of Oregon Acting by and Through the State Board of Higher Education on Behalf of Oregon State University, Corvallis, OR (US)

( * ) Notice: Subject to any disclaimer, the term of this patent is extended or adjusted under 35 U.S.C. 154(b) by 830 days.

(21) Appl. No.: 10/134,045

(22) Filed: Apr. 25, 2002

Related U.S. Application Data

(60) Provisional application No. 60/286,714, filed on Apr. 25, 2001.

(51) Int. Cl.
*H04L 9/06* (2006.01)
*H04L 9/34* (2006.01)
*H04L 9/18* (2006.01)

(52) U.S. Cl. .............................. 380/28; 380/29; 380/30
(58) Field of Classification Search .................... None
See application file for complete search history.

(56) References Cited

OTHER PUBLICATIONS

Koc et al. "Analyzing and Comparing Montgomery Multiplication Algorithms."IEEE Micro(1996):26-33.*
Tenca et al. "A Scalable Architecture for Montgomery Multiplication." Cryptographic Hardware and Embedded Systems No. 1717 (1999): 94-108.*

* cited by examiner

*Primary Examiner*—Kambiz Zand
*Assistant Examiner*—Venkat Perungavoor
(74) *Attorney, Agent, or Firm*—Klarquist Sparkman, LLP

(57) ABSTRACT

Methods and apparatus for Montgomery multiplication process a multiplier operand in k-bit radix-digits, wherein k corresponds to a radix $r=2^k$. A multiplicand operand and a modulus are processed word by word, and then additional bits of the multiplier operand are selected for processing. In a radix r=8 example, the multiplier operand is processed in 3 bit radix-8 digits. A processing kernel is configured to preprocess the modulus and/or the multiplier operand so that at least some values can be obtained from lookup tables.

11 Claims, 8 Drawing Sheets

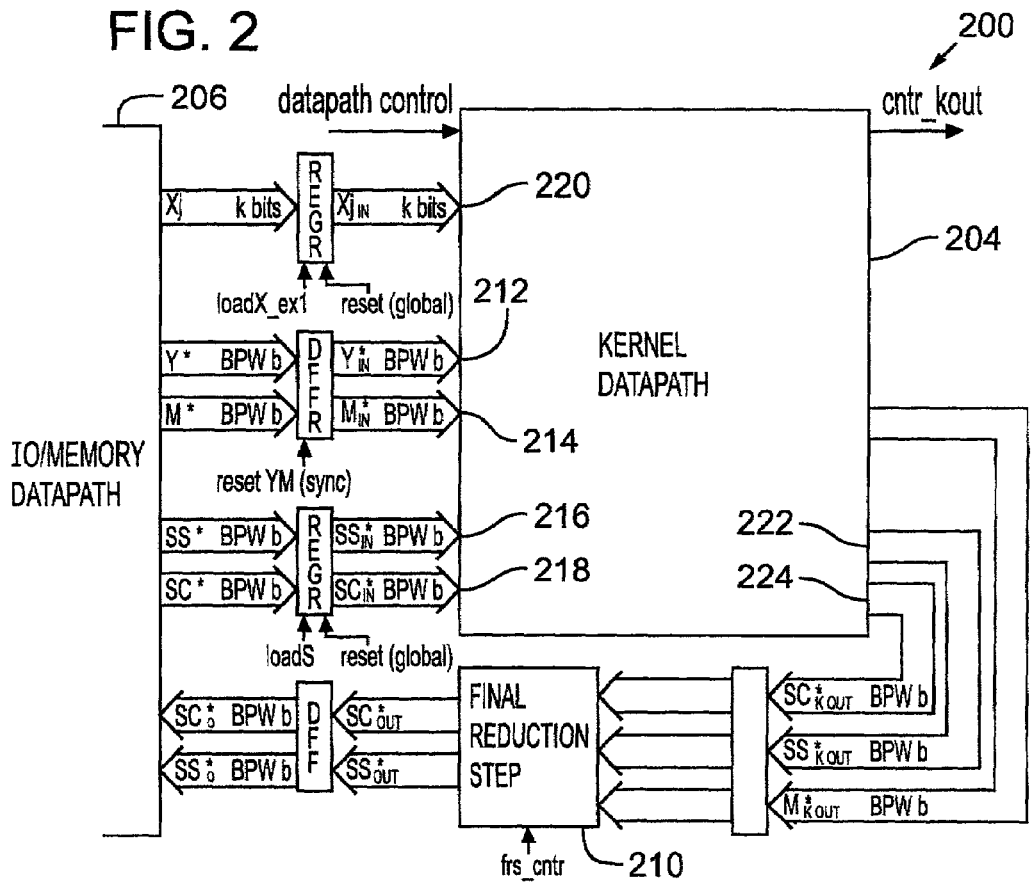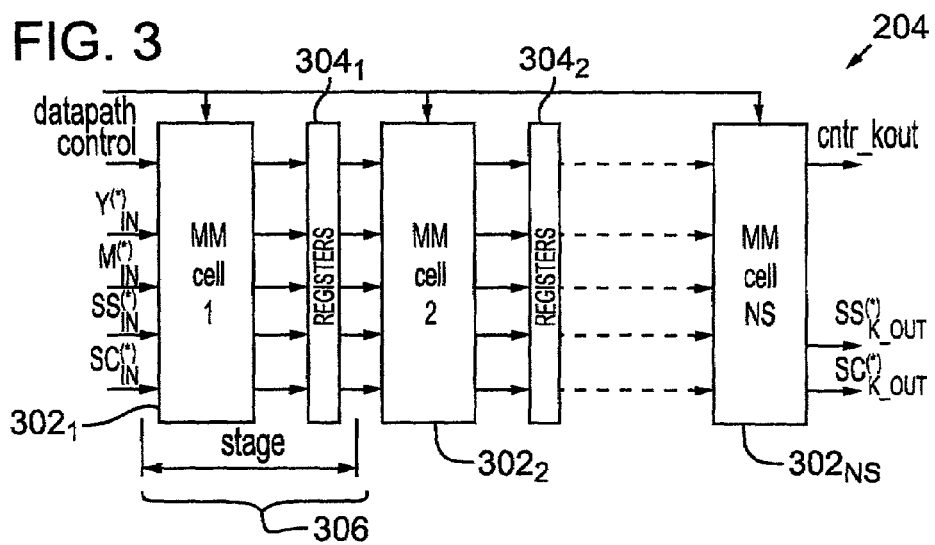

METHODS AND APPARATUS FOR VARIABLE RADIX SCALABLE MODULAR MULTIPLICATION

CROSS REFERENCE TO RELATED APPLICATIONS

This application claims priority from U.S. Provisional Patent Application 60/286,714, filed Apr. 25, 2001, which is incorporated herein by reference.

FIELD OF THE INVENTION

The invention pertains to modular multipliers and cryptographic systems that include such multipliers.

BACKGROUND OF THE INVENTION

Numerous information exchange applications require implementation of cryptographic methods for data security. Typical examples include so-called smart cards and hand-held devices that require compact, inexpensive, and efficient cryptographic hardware and software. These applications can be based on cryptographic methods such as those using the RSA algorithm, the Diffie-Hellman key exchange algorithm, the Digital Signature Standard (DSS), elliptic curves, or other algorithms.

One characteristic of typical cryptographic systems is that very large numbers are used. For example, 128–256 bit numbers are commonly used in elliptic curve systems and 1024–2048 bit numbers are commonly used in systems based on exponentiation. Cryptographic hardware for modular multiplication is typically configured for use with numbers of a fixed precision and operands cannot exceed this precision. Increasing the bit length of cryptographic parameters to increase security requires additional hardware.

While fixed precision cryptographic hardware can be selected to support large numbers, such hardware is generally selected based on a so-called area-time tradeoff. While faster execution times are generally superior, the circuit area required to define hardware capable of fast execution can lead to unacceptably high hardware costs. Therefore, selection of a particular design is generally made based on circuit areas and execution times associated with several designs. Area-time tradeoffs are complicated by selection of a fixed point precision to accommodate potential increases in cryptographic parameter bit length.

Many important cryptographic systems require modular multiplication and modular exponentiation operations. The Montgomery multiplication (MM) method described in P. L. Montgomery, "Modular multiplication without trial division," *Mathematics of Computation*, 44:519–521 (1985) provides a number of implementation advantages, and both software and hardware designs have been developed based on the MM method.

Scalable Montgomery multipliers are described in A. F. Tenca and C. K. Koc, "A scalable architecture for Montgomery multiplication," in C. K. Koc and C. Paar, eds., *Cryptographic Hardware and Embedded Systems: Lecture Notes in Computer Science* 1717:94–108 (Springer, Berlin, 1999) and U.S. patent application Ser. No. 09/621,020, that are incorporated herein by reference. Such scalable multipliers can accommodate operands of various precisions and can be adjusted to occupy a selected circuit area. Scalable multipliers process long-precision numbers using lower precision operations. A hardware core of a fixed precision, usually at most 32 or 64 bits, is reused as directed by a multiplier controller. While scalable multipliers can use operands of arbitrary precision, the processing speeds associated with such multipliers are reduced due to signal broadcast to multiplier components. Accordingly, improved multiplication methods and apparatus are needed.

SUMMARY

Methods of obtaining a Montgomery product of a multiplier operand and a multiplicand operand with respect to a modulus based on a radix include selecting a number of bits of the multiplier operand based on the radix. The selected bits are processed with the multiplicand and the modulus word by word to produce a partial product. Additional bits of the multiplier operand are then processed until all bits of the multiplier operand are processed. The partial product is then processed to obtain the Montgomery product. According to representative examples, the step of processing the partial product includes subtracting the modulus from the partial product if the partial product is greater than the modulus. According to additional examples, the methods include determining a Booth coefficient based on at least the selected bits of the multiplier operand.

Modular multiplication methods include arranging a first operand as a series of words and a modulus as a series of words. A radix is selected and a second operand is arranged as a series of radix digits based on radix. A Montgomery product is determined by processing words of the first operand and the modulus with the radix digits of the second operand.

Methods of obtaining a Montgomery product of a first operand and a second operand based on a radix r include scanning bits of the first operand as radix-length digits and scanning bits of the second operand as words. According to representative examples, bits of a modulus are scanned as words. In additional examples, a first carry value associated with processing words of the second operand and a second carry value associated with processing words of the modulus, respectively, are stored.

Multiple-word, radix $r=2^k$ Montgomery multiplication methods that produce a Montgomery product of operands of bit-length N, wherein k and N are integers, include (i) selecting k-bits of the first operand and (ii) obtaining a Booth coefficient based on at least the selected k-bits. In a step (iii) a value of a first carry bit and a word of an intermediate product based on the Booth coefficient are established. A modulus coefficient is obtained based on at least the selected k bits and a value of a second carry bit and the intermediate product is established based on the modulus coefficient, the intermediate product, and a word of the modulus. The second operand and the modulus are processed word by word to produce values of the first and second carry bits and words of the intermediate product. These steps are repeated by selecting a next k-bits of the first operand until all bits of the first operand are processed. A final product is then determined based on the intermediate product. In additional examples, the first and second carry bits, the Booth coefficient, and the modulus coefficient are processed to produce an intermediate value of word of the product and revised values of the first and second carry bits.

Cryptographic methods include receiving at least one cryptographic parameter and processing the cryptographic parameter by determining a Montgomery product by processing at least one operand in $N_r$adix-bit words.

Methods of modular multiplication include selecting a radix associated with a number of bits $N_{radix}$ and selecting a modulus. A first operand and the modulus are processed word by word and the second operand is processed $N_{radix}$ bitwise to obtain an intermediate Montgomery product that is processed to obtain a final Montgomery product. In additional examples, first and second carry bits associated with processing words of the modulus and the first operand, respectively, are obtained.

Cryptographic systems include inputs configured to receive at least one cryptographic parameter and a modular multiplier configured to produce a Montgomery product by processing at least one operand in $N_{radix}$-bit words.

Montgomery multipliers include word inputs configured to receive words of a modulus and a multiplicand operand. A radix-digit input is configured to receive a radix digit of a multiplier operand and a kernel datapath is configured to produce an intermediate product based on values delivered to the word inputs and the radix-digit input. According to representative examples, the multipliers include a datapath configured to communicate a sum word and a carry word of the intermediate product. In some examples, the multiplier includes memory configured to store the sum word and the carry word. In additional examples, the multipliers include a final product processor configured to process the intermediate product and produce a Montgomery product of the multiplicand operand and the multiplier operand. In some examples, a Booth encoder is configured to process the radix-digit of the multiplier operand, and in a representative example, the Booth encoder includes a lookup table. According to additional examples, the datapath is configured to communicate a word of the modulus.

Montgomery multiplier circuits include a kernel processor configured to process a first operand as radix digits and a second operand and a modulus as words.

These and other features are set forth below with reference to the accompanying drawings.

BRIEF DESCRIPTION OF THE DRAWINGS

FIG. 2 is a schematic block diagram of an MWR$2^k$MM-based multiplier.

FIG. 3 is a schematic block diagram of a kernel datapath.

DETAILED DESCRIPTION

For convenience, symbols used in herein are listed in Table 1.

TABLE 1

Summary of symbol notation.

| | |
|---|---|
| M | modulus for modular multiplication |
| X | multiplier operand for modular multiplication |
| $x_j$ | a single bit of X at position j |
| $X_j$ | a single radix-r digit of X at position j |
| Y | multiplicand operand for modular multiplication |
| N | number of bits in the operands |
| r | Radix ($r = 2^k$) |
| S | partial (intermediate) product or final product |
| k | number of bits per digit in radix r |
| $q_{Y_j}$ | coefficient determining multiple of Y added to S in a $j^{th}$ iteration |
| $q_{M_j}$ | coefficient determining multiple of M added to S in a $j^{th}$ iteration |
| BPW | number of bits per word of either Y, M, or S |
| $NW = \left\lceil \dfrac{N+1}{BPW} \right\rceil$ | number of words in either Y, M, or S |
| NS | number of stages |
| CS | carry-save |
| $C_a, C_b$ | carry bits |
| $(Y^{(NW-1)}, \ldots, Y^{(1)}, Y^{(0)})$ | operand Y represented as multiple words |
| $S_{k-1..0}^{(i)}$ | bits k − 1 to 0 of an $i^{th}$ word of S |

Figure 1A:
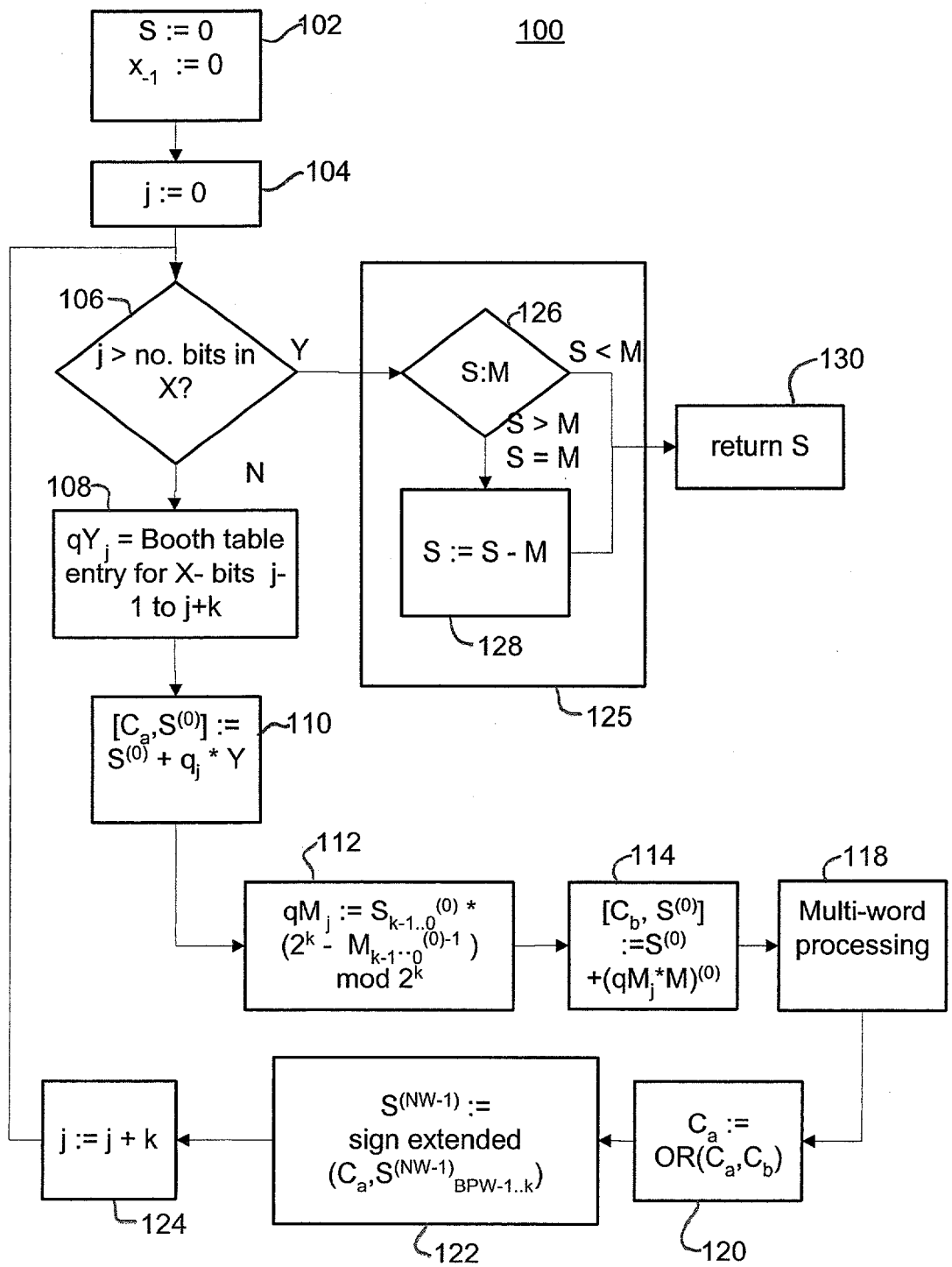
FIG. 1A is a schematic block diagram of a multiple-word high-radix ($2^k$) Montgomery multiplication (MWR$2^k$MM) method.
Figure 1B:
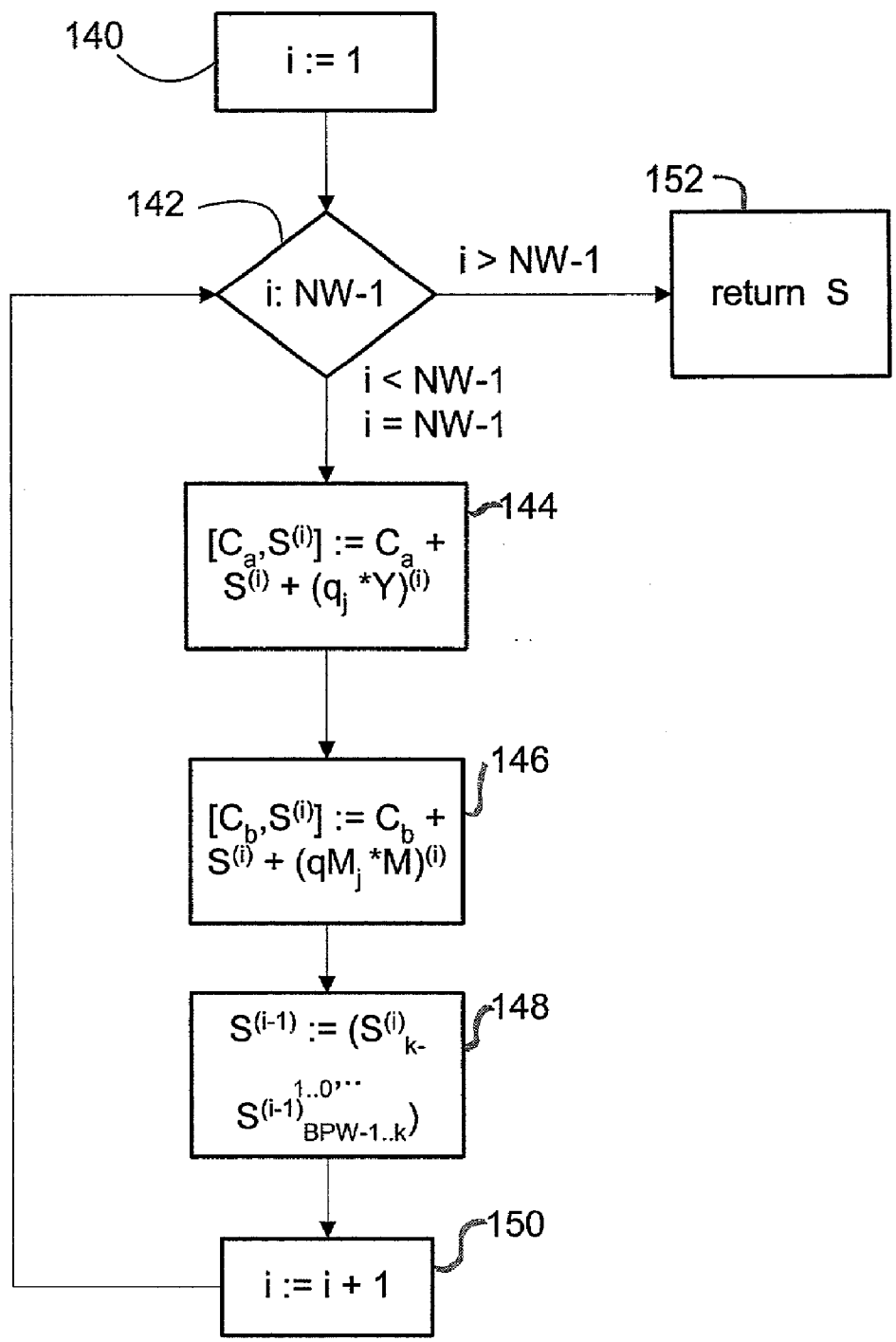
FIG. 1B is a schematic block diagram of a word-multiplication method configured for use in the MWR$2^k$MM method of FIG. 1A.

Table 2 illustrates a multiple-word high-radix ($2^k$) Montgomery Multiplication (MWR$2^k$MM) method using the symbol notation of Table 1. A schematic block diagram of this method is shown in FIGS. 1A–1B.

TABLE 2

Multiple-word high-radix Montgomery multiplication (MWR$2^k$MM) method.

| | |
|---|---|
| Step 1: | $S := 0; x_{-1} := 0$ |
| Step 2: | FOR $j := 0$ TO $N - 1$ STEP k |
| Step 3: | $q_{Y_j} = \text{Booth}(x_{j+k..j-1})$ |
| Step 4: | $(C_a, S^{(0)}) := S^{(0)} + (q_{Y_j} * Y)^{(0)}$ |
| Step 5: | $q_{M_j} := S_{k-1..0}^{(0)} * (2^k - M_{k-1..0}^{(0)^{-1}}) \bmod 2^k$ |
| Step 6: | $(C_b, S^{(0)}) := S^{(0)} + (q_{M_j} * M)^{(0)}$ |
| Step 7: | FOR $i := 1$ TO $NW - 1$ |
| Step 8: | $(C_a, S^{(i)}) := C_a + S^{(i)} + (q_{Y_j} * Y)^{(i)}$ |
| Step 9: | $(C_b, S^{(i)}) := C_b + S^{(i)} + (q_{M_j} * M)^{(i)}$ |
| Step 10: | $S^{(i-1)} := (S_{k-1..0}^{(i)}, S_{BPW-1..k}^{(i-1)})$ |
| | END FOR i |
| Step 11: | $C_a := C_a$ or $C_b$ |
| Step 12: | $S^{(NW-1)} := \text{sign ext }(C_a, S_{BPS-1..k}^{(NW-1)})$ |
| | END FOR j |
| Step 13: | IF $S \geq M$ THEN $S := S - M$; RETURN S |

The parameter k is selected based on a number of bits of the operand X scanned during each loop, or the radix r of the computation, wherein $r=2^k$. Each loop iteration (computational loop) scans k-bits of X (a radix-r digit $X_j$) and determines a value $q_Y$, based on Booth encoding as described in, for example, A. D. Booth, "A signed binary multiplication technique," *Q. J. Mech. Appl. Math.* 4:236–240 (1951). Booth encoding is applied to a bit vector to reduce the complexity of hardware multiple generation. For radix-8 operations, a Booth function is:

$$\text{Booth}(\underline{X}_i, x_{i-1}) = -4x_{i+2} + 2x_{i+1} + x_i + x_{i-1},$$

wherein $\underline{X}_i = (x_{i+2}, x_{i+1}, x_i)$ is a radix-8 digit (i=km where m is an integer), $x_j \in \{0, 1\}$, and $x_{i-1}$ is a most significant bit (MSbit) of a previous radix-8 digit. For radix-2 computation, $k=1$ and $q_{Y_j} = x_j$. The Booth function can be similarly defined for other values of k.

Carry bits $C_a$ and $C_b$ are propagated from computation of one word to a computation of a next word. In order to make the least significant k-bits of S zero, $q_{M_j}$*M is added to the partial product to avoid losing bits in the shift operation of Step 10. The value of $q_{M_j}$ that satisfies this condition is determined by examining the least significant k-bits of S generated at Step 4.

In steps 11 and 12 a most significant (MS) word of S is generated and sign extended. The use of Booth encoding can cause intermediate values of S to be negative. The final result in S at Step 13 (a "final reduction" step) is positive, but can be greater than the modulus M. In Step 13, the intermediate value S is reduced to be less than the modulus. M is chosen as $2^{N-1} < M < 2^N$ and the result is bounded as $0 \leq S < 2M$. Therefore, a single subtraction of the modulus M assures that S<M.

Figure 1C:
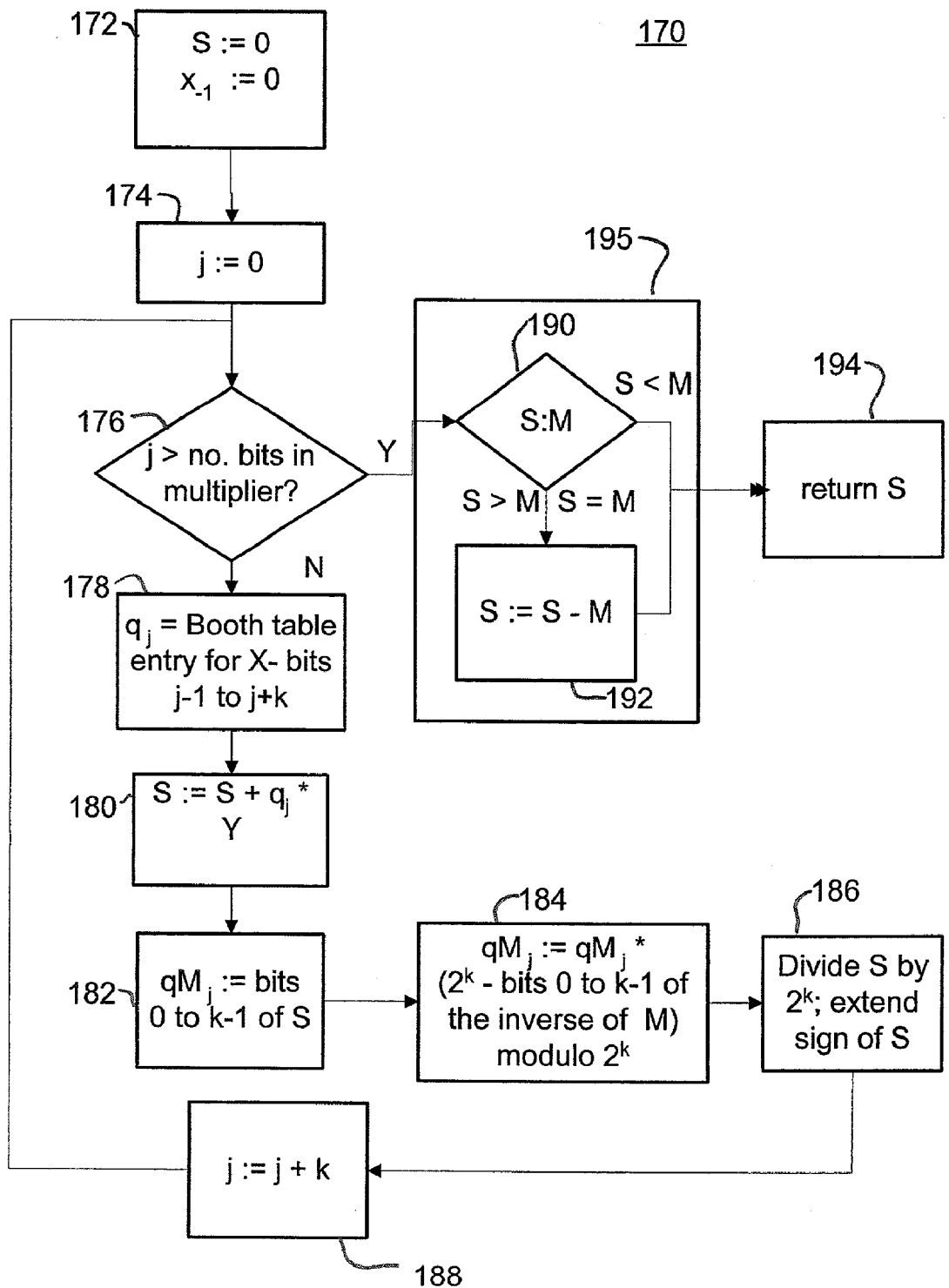
FIG. 1C is a schematic block diagram of a high radix Montgomery multiplication (R$2^k$MM) method.

The MWR2$^k$MM method is a multiple-word version of a full-precision method that is illustrated for convenience in Table 3. The full precision method is referred to herein as an R2$^k$MM method and is illustrated in FIG. 1C.

TABLE 3

Full precision Montgomery multiplication (R2$^k$MM) method.

Step

1:     S := 0
        $x_{-1}$ := 0
2:     FOR j := 0 TO N − 1 STEP k
3:        $q_{Y_j}$ = Booth($x_{j+k, j-1}$)
4:        S := S + $q_{Y_j}$ * Y
5:        $q_{M_j}$ := $S_{k-1 \ldots 0}$ * ($2^k - M_{k-1 \ldots 0}^{-1}$) mod $2^k$
6:        S := sign ext (S = $q_{M_j}$ * M)/$2^k$
        END FOR;
7:     IF S ≥ M THEN S := S − M
        END IF It can be shown that $q_M$ is:

$$q_M * M = -S (\bmod\ 2^k).$$

See, for example, P. Kornerup, "High-radix modular multiplication for cryptosystems," in E. Swartzlander, Jr. et al., eds., *Proceedings, 11th Symposium on Computer Arithmetic* (IEEE Computer Society Press, 1993). This can be rewritten as $$S_{k-1 \ldots 0} + q_M * M_{k-1 \ldots 0} = 0 \bmod 2^k.$$

The latter equation is another representation of the requirement that the last k bits of S must be zeros. Step 5 corresponds to this requirement as shown below:

$$q_{M_j} = S_{k-1 \ldots 0} * (2^k - M_{k-1 \ldots 0}^{-1}) \bmod 2^k$$

$$q_{M_j} = S_{k-1 \ldots 0} * (-M_{k-1 \ldots 0}^{-1}) \bmod 2^k$$

$$S_{k-1 \ldots 0} = S \bmod 2^k, M_{k-1 \ldots 0} = M \bmod 2^k$$

$$q_{M_j} = S * (-M^{-1}) \bmod 2^k$$

$$q_{M_j} * M = -S \bmod 2^k$$

It can also be shown that $$Y = \sum_{j=0}^{\lceil \frac{N-1}{k} \rceil} (2^k)^j * qY_j,$$

based on properties of Booth encoding.

FIGS. 1A–1B are schematic block diagrams illustrating a MWR2$^k$MM method 100 in which N-bit operands X and Y are multiplied modulo-M using a radix $2^k$. With reference to FIG. 1A, in a step 102 a product variable S is initialized, and in a step 104, an X-operand counter j associated with the operand X is initialized. In a step 106, the value of the X-operand counter is tested to determine if all bits of the operand X have been processed. If additional X-bits are available, steps 108, 110, 112, 114, 118, 120, and 122 are executed. (Steps 108, 110, 112, and 114 correspond to steps 3, 4, 5, and 6, respectively, shown in Table 2. Steps 120, 122 correspond to steps 11, 12, respectively.) In a step 124, the X-operand counter j is incremented by k and processing returns to the step 106. If all bits of X have been processed, a reduction step 125 is executed and the product S is returned in a step 130.

In the step 108, a Booth value is obtained by computation, or from a lookup table. The Booth value is based on k+1 bits of the operand X. In the step 110, values of the carry variable $C_a$ and $S^{(0)}$ are obtained based on a sum of a current value of $S^{(0)}$ with a product of $q_{Y_j}$ and $Y^{(0)}$. The steps 112, 114 perform additional computations to produce a value for the carry bit $C_b$ and a revised value of $S^{(0)}$. Words of the modulus M and the operand Y are processed in the step 118. After completion of the step 118, the carry bit $C_a$ is re-evaluated in the step 120 and a value of $S^{(NW-1)}$ is determined in step 122. In the step 124, the X-bit counter is incremented so that additional bits of the operand X can be processed.

Referring to FIG. 1B, the multi-word processing step 118 includes steps 140, 142 of initializing and incrementing a Y-word counter i. Carry bit values and intermediate values of product words $S^{(i)}$ are obtained in steps 144, 146, and values of product words $S^{(i-1)}$ are obtained in a step 148. The Y-word counter is incremented in a step 150 and additional words of Y and M are processed. After all words are processed, an intermediate value of the product S is returned in a step 152.

Some values used in the method 100 of FIGS. 1A–1B can be obtained by direct computation or provided from lookup tables. For example, values of $q_M$ contain portions that are independent of the operands and these portions can be precomputed and stored.

For convenience, FIG. 1C illustrates a high-radix Montgomery multiplication (R2$^k$MM) method 170 that includes an initialization step 172 in which a product value S and a bit value $x_{-1}$ are assigned initial values. In a step 174, a computation loop index j is set to zero and in a step 176, the value of the loop index j is tested to determine if j is larger than a number of bits N in an operand X. If j is less than or equal to N, then computation steps 176, 178, 180, 182, 184, and 186 are executed and the loop index is incremented by k in a step 188. Additional bits can be processed or, if all bits have been processed, a final product value is obtained in a step 195 in which the value of S can be reduced by the modulus M in steps 190, 192.

Using the method of Table 2 and FIGS. 1A–1B, a multiplicand Y, a modulus M, and a result S are divided into words so that numbers of gates and propagation delays are controlled. A multiplier X is supplied in k-bit portions. For operands having precisions as large as thousands of bits, a conventional system configured for simultaneous multiplication of all bits requires unacceptably large numbers of input and output connections, and gate outputs must drive long conductors.

Multiplication operations $(q_Y*Y)^{(*)}$ and $(q_M*M)^{(*)}$ shown in steps 4 and 6, respectively, of the MWR2$^k$MM method of Table 2 can be implemented with multiplexers (MUXes) and adders. The shifting operation of step 10 is readily performed in hardware. Additions can be done with carry-save adders (CSAs), and S can be kept in redundant form. Carries generated during addition are not propagated but stored in a separate bit-vector along with a bit-vector for sum bits. The operations of steps 3 and 5 (finding coefficients $q_Y$ and $q_M$) can be based on lookup tables. The coefficients $q_Y$ can be pre-computed before the computational cycle begins since these coefficients depend only on the least significant k bits of X.

A representative configuration of a Montgomery multiplier 200 based on a MWR2$^k$MM method is illustrated in FIG. 2. The multiplier 200 includes a kernel datapath 204, an IO/memory datapath (IO datapath) 206, and a functional datapath that interconnects the kernel datapath 204 and the IO/datapath 206. Computation occurs in the kernel datapath 204 that is configured based on a MWR2$^k$MM method. A control block (not shown in FIG. 2) supplies control signals for synchronization. A final reduction module 210 computes a final product in a suitable form for the multiplier's output, implementing step 13 of the method of Table 2.

The kernel datapath 204 receives BPW-bit words of Y, M, S (represented in a carry-save form as SS and SC), and k bits of X at a multiplicand input 212, a modulus input 214, partial product inputs 216, 218, and a multiplier input 220, respectively. BPW-bit words of a new partial product S are delivered to outputs 222, 224. The notation (*) indicates that the quantity is one word of a corresponding vector. For example, $Y^{(*)}$ represents one word of a vector Y. (As used herein, a vector is a concatenation of words or bits.) The multiplier 200 is typically configured so that signals change at every clock cycle. Depending on the kernel configuration (i.e., a number of stages and word size), the operands can pass through the IO/datapath 206 several times. The operand $X_j$ is represented as a k-bit signal that provides the bits of X needed for step 3 of the MWR2$^k$MM method of Table 2.

The IO/datapath block 206 provides a user interface and memories for the operands, the modulus, and intermediate values. The configuration of the IO/datapath block can be implemented in various ways depending on an intended application or system architecture. The IO/datapath block 206 is configured to receive and supply signals in conjunction with the kernel datapath 204 so that appropriate inputs/outputs are delivered and received. In addition, the IO/datapath is configured in association with the kernel datapath 204 so that, for example, inputs and outputs are provided at appropriate times.

Kernel Datapath

The kernel datapath 204 is illustrated in FIG. 3 as a pipeline of multiplier cells (MMcells $302_1$ ... $302_{NS}$) separated by registers $304_1$ ... $304_{NS-1}$. Datapath stages such as the datapath stage 306 typically include an MMcell and an associated register. The MMcell is typically configured to implement one iteration of the FOR loop (steps 3 to 12) of the MWR2$^k$MM method of Table 1. A datapath stage receives one word of Y, M, SS and SC as inputs, typically in response to a clock cycle. In addition, (NS*k) bits of X are transferred to the kernel datapath over 2*NS clock periods, wherein NS is a number of stages. Depending on the computation's progress, k bits of X are loaded in a different stage every 2 clock cycles. Each stage needs these bits at different times. Thus, this signal is made common for all stages with internal controller that directs appropriate signal loading. The MS bit of $X_i$ is used to Booth encode $X_{i+1}$, as explained above so that a cell stores these two pieces of information in order to properly encode a radix-r digit of X. The kernel datapath typically outputs one word of SS and SC every clock cycle. The pipeline outputs are shown as $SS^K_{OUT}{}^{(*)}$ and $SC_{K\_OUT}{}^{(*)}$.

The final reduction module 210 executes a final reduction step of the MWR2$^k$MM method. This final reduction is executed after a last iteration of the loop scanning the bits of X. During intermediate iterations, the final reduction module 210 propagates signal values from the kernel datapath 204 without additional processing. The kernel datapath provides word-serial output so that the final reduction can be executed as words of both result vectors become available. Whether $S \geq M$ is not known before the last pair of words for S is computed in the datapath. The final reduction block implements the computation for both conditions, $S \geq M$, when S–M is generated, and S<M, when correction is unnecessary. In both cases, a carry-save to non-redundant conversion is used. The resulting vectors are stored at locations associated with SS and SC (the two bit-vectors of the intermediate product) in the IO block. After the last pair of words of S is processed, a flag is set by the control circuitry indicating which of the conditions $S \geq M$ or S<M is satisfied. The product is in either SS or SC.

Kernel Processor

Figure 4A:
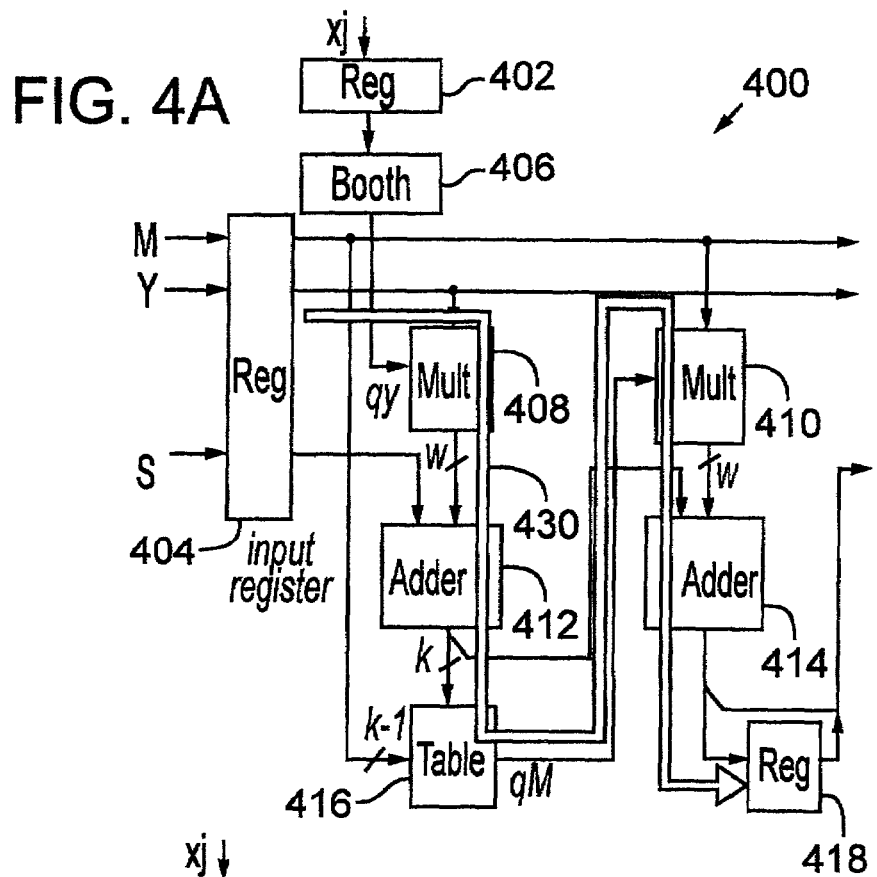
FIGS. 4A–4B are schematic block diagrams of kernel cells.

A direct design of a kernel processing element results in a kernel processor 400 shown in FIG. 4A. Registers 402, 404 are configured to receive values of $x_j$ and M, Y, S, respectively, and a register 418 is configured to retain an output. The kernel processor 400 includes a Booth encoder 406, multiplier cells 408, 410, adders 412, 414, and a look-up table 416. Shifting and alignment are selected based on control inputs that are not shown in FIG. 4A.

The cell operates on k+1 bits of the multiplier X (one bit is obtained from a previous scan) and one word of the multiplicand (Y), the modulus (M), and the partial product (S). Booth encoding is generated with a lookup table to find a coefficient $q_{Y_j}$. Negative multiples of Y are implemented by complementing positive counterparts and adding "1" (two's complement sign change). The coefficient $q_{M_j}$ depends on the last k bits of the partial product S and the last k–1 bits of the modulus M (Step 5). Recall that M is odd. Before S is shifted to the right, the value $q_{M_j}M$ is added to S (Steps 6 and 9). The coefficient $q_{M_j}$ is in the range $[0, 2^k-1]$. For radix-8, the greatest value occurs for $S_{2\ldots0}{}^{(0)}$="001", and $M_{2\ldots0}{}^{(0)}$="001" ($q_{M_j}=7$). The lowest value occurs for $S_{2\ldots0}{}^{(0)}$="000", and $M_{2\ldots0}{}^{(0)}$="001" ($q_{M_j}=0$).

Multiple generation for high-radix designs can be complicated because $q_Y$ and $q_M$ can have values that are not powers of 2. For example, the bit-vector 2Y can be produced from Y by left-shifting Y by one bit, but the bit-vector 3Y is produced by adding Y and 2Y. This addition operation generally requires considerable additional execution time in comparison with bit-shifting operations.

Figure 4B:
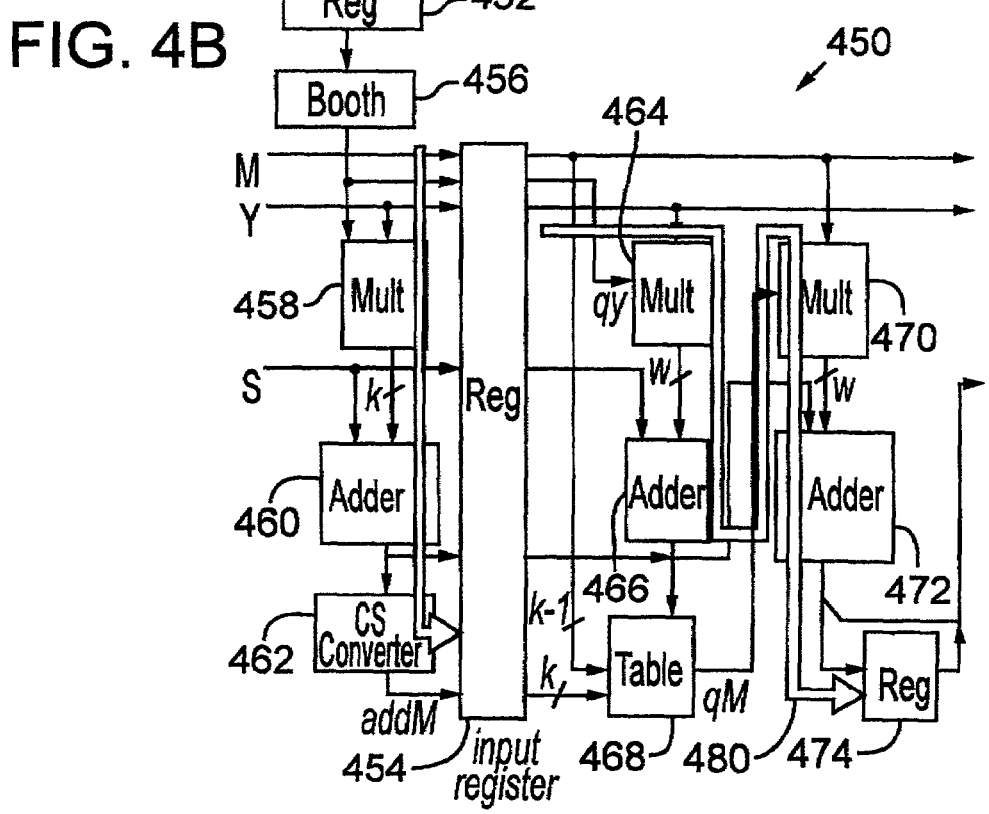

A critical path 430 in the configuration of FIG. 4A is relatively long. The high radix increases table delay and size, and multiple generation delay and multiplier size. To increase performance, the configuration was re-timed to produce an alternative configuration shown in FIG. 4B. The organization of FIG. 4B is selected to shorten the processing critical path by relocating logical components such as those of FIG. 4A. One problem with the kernel processor 400 is the long critical path that passes through several processing modules. Determination of $q_{M_j}$ depends on k LSBits of the partial product from the previous computational cycle, $S_{k-1} \ldots 0^{(0)}$, k LSBits of $Y^{(0)}$, and coefficients $q_{Y_j}$. If the word size for S is more than 2k bits, then the k LSBits of S for the next pipeline stage are available before the whole word $S^{(0)}$ is available. The idea is to advance the information on the k least-significant bits (LSBits) of the shifted $S^{(0)}$. In the configuration of FIG. 4A, these bits are propagated between two registers with no additional logic operations. In the configuration of FIG. 4B, logic determining $q_M$ is performed on the bits.

Referring to FIG. 4B, a kernel processor 450 includes registers 452, 454, 474. A multiplier 458, adder 460, and carry-save (CS) converter 462 are situated to process X and Y values prior for delivery to the register 454. Additional processing is provided by multipliers 464, 470, adders 466, 472, and a lookup table 468. The kernel processor 450 defined a critical path 480.

A difference between these kernel processors 400, 450 is that a portion of a first adder is situated before the input registers, and this portion of the adder computes the k LSBits of the not yet shifted partial product that is used to compute $q_M$. The k-bit vector addM represents these bits in non-redundant form, and is applied to the lookup table 468 that generates $q_M$ in a next clock cycle, considering also k−1 bits of the modulus M. As a result of this hardware organization, path delays do not exceed the delay of two adders and two MUXes.

The computation done on the LSBits by the leftmost adder 460 is also done for all the other remaining operand words. So, while the leftmost adder 460 works on the LS bits of a word, the adder 466 is be working on the other bits of the same word. There is one clock cycle difference between these processing operations, and control signals should be configured based on this timing difference.

Radix-8 Example

Figure 5:
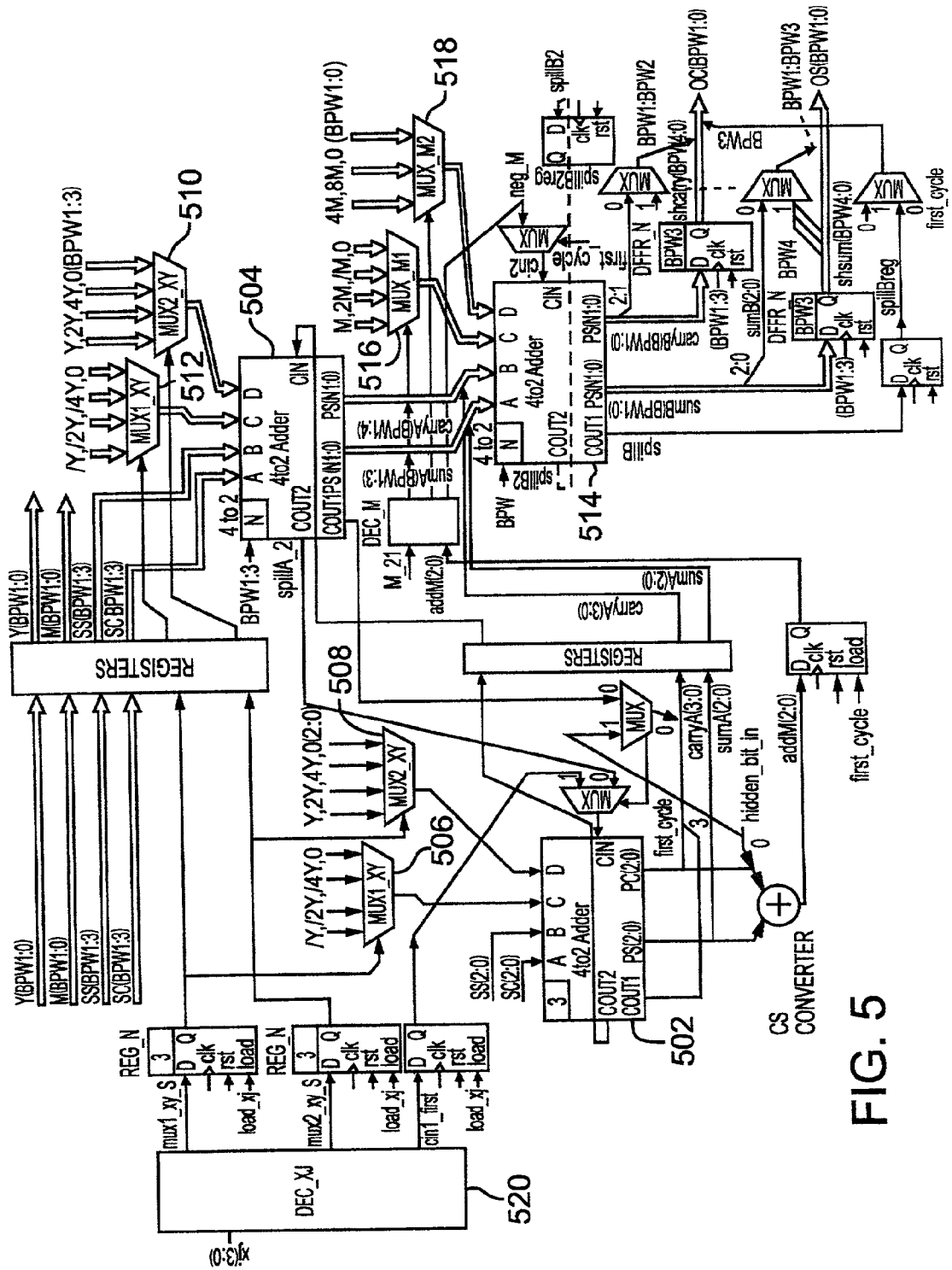
FIG. 5 is a schematic block diagram of a radix-8 Montgomery multiplier cell.

With reference to FIG. 5, a radix-8 Montgomery multiplier cell (MMcell) 500 includes 4-to-2 adders 502, 504 that receive selected values of products of Y or associated complements from xy-multiplexers 506, 508 and 510, 512, respectively. A 4-to-2 adder 514 receives inputs based on products of M and associated complements from M-multiplexers 516, 518. A processing block (DEC_XJ) 520 receives bits of a multiplier operand X for Booth encoding.

One way of implementing coefficients $q_Y$ and $q_M$ is to split the coefficients into components that generate simple multiples and add these simple multiples in an adder. For example, for r=8, two values can be used. For example, $q_Y=3$ is split into 2 and 1, and the 3*Y multiple is generated as 2*Y+1*Y or 4*Y−1*Y using two bit-vectors, 2*Y and 1*Y, or 4*Y and −1*Y. It is generally efficient to choose one of the components as a negative value. Negative bit-vectors such as —Y are implemented by inverting a positive bit-vector (Y in this example), and introducing a carry-in with a value "1". Since each 4-to-2 adder in the example of FIG. 5 has only one carry-in input, only one of the components is negative.

The multiplexers generate multiples $(q1_{Y_j}*Y)^{(*)}$ and $(q2_{Y_j}*Y)^{(*)}$. Booth encoding is done according to Table 4 in the DEC_XJ functional block 520. The backslash symbol is used to denote a bit-complement operation. For example, (/2*Y) indicates multiplication of Y by 2 and complementing (or negating) bits. The values 2 and −2 are formed in two different ways. This simplifies decoding logic for $X_j$. The outputs of DEC_XJ include control signals for the multiplexers as well as the carry-in bit for the first 4-to-2 adder (during the first computational cycle only).

TABLE 4

Booth encoding for $q_Y$.

| $X_j$(3:0) | $q_{Y_j}$ | $q1_{Y_j}$ | cin | $q2_{Y_j}$ | $X_j$(3:0) | $q_{Y_j}$ | $q1_{Y_j}$ | cin | $q2_{Y_j}$ |
|---|---|---|---|---|---|---|---|---|---|
| 0000 | 0 | 0 | 0 | 0 | 1000 | −4 | /4 | 1 | 0 |
| 0001 | 1 | 0 | 0 | 1 | 1001 | −3 | /4 | 1 | 1 |
| 0010 | 1 | 0 | 0 | 1 | 1010 | −3 | /4 | 1 | 1 |
| 0011 | 2 | 0 | 0 | 2 | 1011 | −2 | /4 | 1 | 2 |
| 0100 | 2 | /2 | 1 | 4 | 1100 | −2 | /2 | 1 | 0 |
| 0101 | 3 | /1 | 1 | 4 | 1101 | −1 | /1 | 1 | 0 |
| 0110 | 3 | /1 | 1 | 4 | 1110 | −1 | /1 | 1 | 0 |
| 0111 | 4 | 0 | 0 | 4 | 1111 | 0 | 0 | 0 | 0 |

Because the coefficients $q_Y$ and $q_M$ are split into two components, adders are provided with an additional input. The two 4-to-2 adders have a total of two carry-out bits propagating between sequential words of the partial product S. One carry-out is inserted at the LSB position of vector carryA. The other carry-out is introduced back to the same adder as a carry-in bit for the next word of S.

The coefficient $q_{M_j}$ depends on the 3 LSBits of the partial product S and the three LSBits of the modulus M. The product is represented by 2 vectors. There is one additional input bit, hidden-bit, which contributes to $q_{M_j}$. The hidden-bit is generated by carry propagation in the least significant bits of the least significant word computation, which are zeroed in the process. Knowing that the LSB of M is always "1" and that the LSB of carryA is always "0", $q_{M_j}$ depends on eight bits: $sumA_{2 \ldots 0}$, $carryA_{2 \ldots 1}$, hidden-bit, and $M_{2 \ldots 1}^{(0)}$.

In Step 10 of the MWR8MM algorithm, the partial product S is right-shifted by three bits. Because carry-save representation (CS) is used for S, the LS words of the two bit-vectors ($sumB^{(0)}$, $carryB^{(0)}$) after Step 6 can be, for example: $sumB^{(0)}$=x . . . x110 and $carryB^{(0)}$=x . . . x010, where x represents any value of the bit in this position. The last three bits of S are equivalent to zeros when converted to a non-redundant form. However, data will be lost if these bits are shifted out without taking into account the carry propagation (110+010=<u>1</u>000). The carry bit generated in this case is the hidden-bit.

Instead of using a carry-propagate adder to obtain the hidden-bit, in radix 8 computation, the following observation is used. The last bit of $carryB^{(0)}$ is always "0", therefore, to detect a hidden-bit it is enough to test if there is a "1" value in the second or third bits of either $carryB^{(0)}$ or $sumB^{(0)}$. The circuit for the hidden-bit detection is reduced to $sumB_2^{(0)}+sumB_1^{(0)}$. These two bits of $sumB^{(0)}$ are stored in flip-flops, thus, the hidden-bit logic does not stand in the critical path for the whole cell. Since the hidden bit is found after the operation on the LS word is done, it is transferred from one cell to another, as part of the LS word. It can be inserted in the free LSBit position in $carryA^{(0)}$ and also participates in determining $q_M$.

If all eight bits are used for a lookup table for $q_M$, the table will have 256 entries. The number of entries can be reduced by assimilating the carries for $sumA_{2 \ldots 0}$, $carryA_{2 \ldots 1}$, and hidden-bit by a three-bit adder. The resulting three-bit vector is named addM:

$$addM_{2 \ldots 0} = (sumA_{2 \ldots 0} + (carryA_{2 \ldots 1}, 0) + (00, \text{hiddenbit})) \bmod 8,$$

reducing the table for $q_M$ to only 32 entries. It is represented by the DEC_M functional block according to Table 5. The decoder outputs are the control signals for the multiplexers implementing $(q1_{M_j*M_j}{}^{(*)}$ and $(q2_{M_j}*M)^{(*)}$. The decoder also has an output which is asserted '1' whenever $q1_{M_j}$ is negative. This signal becomes a carry-in for the second four-to-two adder.

The total computational time for the kernel is a product of the number of clock cycles ($T_{CLKs}$) and the clock period ($t_p$). The clock period is derived from the synthesis results, and depends on the number of stages, the word size, and other parameters. The number of clock periods to complete a computation is based on the steps of the MM method.

TABLE 5

Decoding for $q_M$.

| add | $q_{M_j}{}^{(o)}$ $M_{2..1}$ | | | | $q^1{}_{M_j}{}^{(o)}$ $M_{2..1}$ | | | | cin2 $M_{2..1}{}^{(o)}$ | | | | $q2_{M_j}{}^{(b)}$ $M_{2..1}$ | | | |
|---|---|---|---|---|---|---|---|---|---|---|---|---|---|---|---|---|
| $M_{2..0}$ | 00 | 01 | 10 | 11 | 00 | 01 | 10 | 11 | 00 | 01 | 10 | 11 | 00 | 01 | 10 | 11 |
| 000 | 0 | 0 | 0 | 0 | 0 | 0 | 0 | 0 | 0 | 0 | 0 | 0 | 0 | 0 | 0 | 0 |
| 001 | 7 | 5 | 3 | 1 | /1 | 1 | /1 | 1 | 1 | 0 | 1 | 0 | 8 | 4 | 4 | 0 |
| 010 | 6 | 2 | 6 | 2 | 2 | 2 | 2 | 2 | 0 | 0 | 0 | 0 | 4 | 0 | 4 | 0 |
| 011 | 5 | 7 | 1 | 3 | 1 | /1 | 1 | /1 | 0 | 1 | 0 | 1 | 4 | 8 | 0 | 4 |
| 100 | 4 | 4 | 4 | 4 | 0 | 0 | 0 | 0 | 0 | 0 | 0 | 0 | 4 | 4 | 4 | 4 |
| 101 | 3 | 1 | 7 | 5 | /1 | 1 | /1 | 1 | 1 | 0 | 1 | 0 | 4 | 0 | 8 | 4 |
| 110 | 2 | 6 | 2 | 6 | 2 | 2 | 2 | 2 | 0 | 0 | 0 | 0 | 0 | 4 | 0 | 4 |
| 111 | 1 | 3 | 5 | 7 | 1 | /1 | 1 | /1 | 0 | 1 | 0 | 1 | 0 | 4 | 4 | 8 |

The multiples of Y and M, such as 2Y, 4Y, 2M, 4M, 8M, require that these operands be left-shifted. Caused by the word-serial scanning of this algorithm, this shifting requires some of the MSBits from the previous words of Y and M to be kept when the new words arrive. If it is the first word (first_cycle='1'), then a number of zeros is shifted in to produce the needed multiple. Otherwise, the MSBits of the previous word are shifted in as the LSBits of the current word.

The leftmost adder operates on the LSbits of words j of S and $q_1Y$ while the topmost adder is operating of the MSbits of word j−1. This arrangement requires that the carry-out propagation among words of the partial sum A (carryA and sumA) be considered carefully. The carry-out of the topmost adder, net spillA2, is introduced immediately as carry-in for the leftmost adder. The carry-out of the leftmost adder is delayed one clock cycle before it is introduced as carry-in to the topmost adder.

Performance Examples

Radix-8 kernel designs were compared with a radix-2 design. Although the initial and re-timed configurations were evaluated, only results for the re-timed radix-8 design are presented in detail.

Mentor Graphics tools were used to generate simulation data based on an AMI05_slow (0.5 µm) process provided in a Mentor Graphics ASIC Design Kit (ADK). Before synthesis, designs were simulated for functional correctness using MODELSIM. Designs were described in VHDL, synthesized with LEONARDO as flattened designs (without hierarchy), and laid-out using ICSTATION. ICSTATION provides RC parameter extraction so that time delay values for all wires in the design can be estimated to improve simulation accuracy. Designs were back annotated and verified with VELOCITY and simulation values were obtained based on several trials.

Kernel area depends on the number of stages (NS) in the pipeline and the word size (BPW).

The area $A_{kernel_{r8}}$ for the radix-8 kernel was obtained as approximately $$A_{kernel_{r8}} = 92*BPW*NS + 269*NS - 9.42*BPW - 35.5.$$

Table 6 shows critical path delay ($t_p$) as a function of the number of stages NS for the re-timed radix-8 kernel as well as the number of bits per word in the operands. These two parameters also determine the design area. The bold-faced numbers in Table 4 show tested configurations and the remaining numbers are obtained by linear interpolation. An increase in area leads to an increase in the critical path delay. This is due to increased wire lengths (parasitic resistance and capacitance) and fan-outs for the gates. A setup time plus clock-to-Q propagation time of 1.2 ns for flip-flops is given for AMI05-slow technology. The hold time requirement can be neglected. The setup and hold time requirements scale with circuit technology giving the same proportional effect on the clock period.

TABLE 6

Critical path delay for radix-8 kernel (nsec).

| | Bits Per Word | | | | |
|---|---|---|---|---|---|
| NS | 8 | 16 | 32 | 64 | 128 |
| 1 | 10.7 | 10.3 | 13.1 | 18.9 | 20.2 |
| 2 | 10.8 | 12.1 | 14.4 | 20.5 | 30.4 |
| 3 | 10.9 | 12.5 | 15.7 | 23.0 | |
| 4 | 11.0 | 12.9 | 17.0 | 25.4 | |
| 5 | 11.1 | 12.7 | 17.6 | | |
| 6 | 11.1 | 13.5 | 18.2 | | |
| 7 | 11.2 | 14.3 | 18.7 | | |
| 8 | 11.2 | 14.9 | 19.2 | | |
| 9 | 11.2 | 15.1 | | | |
| 10 | 11.2 | 15.2 | | | |
| 11 | 11.2 | 15.3 | | | |
| 12 | 11.2 | 15.4 | | | |
| 13 | 11.3 | 15.4 | | | |
| 14 | 11.3 | 15.4 | | | |
| 15 | 11.3 | 15.5 | | | |
| 20 | 11.4 | | | | |
| 26 | 13.0 | | | | |

Two cases can be considered: (1) NW≦2*NS, and (2) NW>2*NS. The variable $$NW = \left\lceil \frac{N+1}{BPW} \right\rceil$$

represents the number of words in the N-bit operands with chosen word size of BPW bits. Because of the extra register in the pipeline, a word propagates through the pipeline for (2*NS+1) clock cycles. For radix-8, since 3 bits of X are used in each stage, $$\left\lceil \frac{N}{3*NS} \right\rceil$$

pipeline cycles are used. A total number of clock cycles needed for the re-timed radix-8 Montgomery multiplication design is:

$$T_{CLK_s} = \begin{cases} \left\lceil \frac{N}{3*NS} \right\rceil * (2*NS+1) + NW + 1, & \text{if } NW \leq 2*NS \\ \left\lceil \frac{N}{3*NS} \right\rceil * (NW+1) + 2*NS, & \text{if } NW > 2*NS \end{cases}$$

It can be shown that when NW<2*NS adding more stages to the pipeline has somewhat unpredictable effect on the total number of clock cycles. In this case, the number of words NW has a small effect on the computational time, while the fraction $$\left\lceil \frac{N}{3*NS} \right\rceil$$

has minimums and maximums as the number of stages NS changes. Thus, it may be the case that a design with more stages will be slower than a design with fewer stages.

Figure 6A:
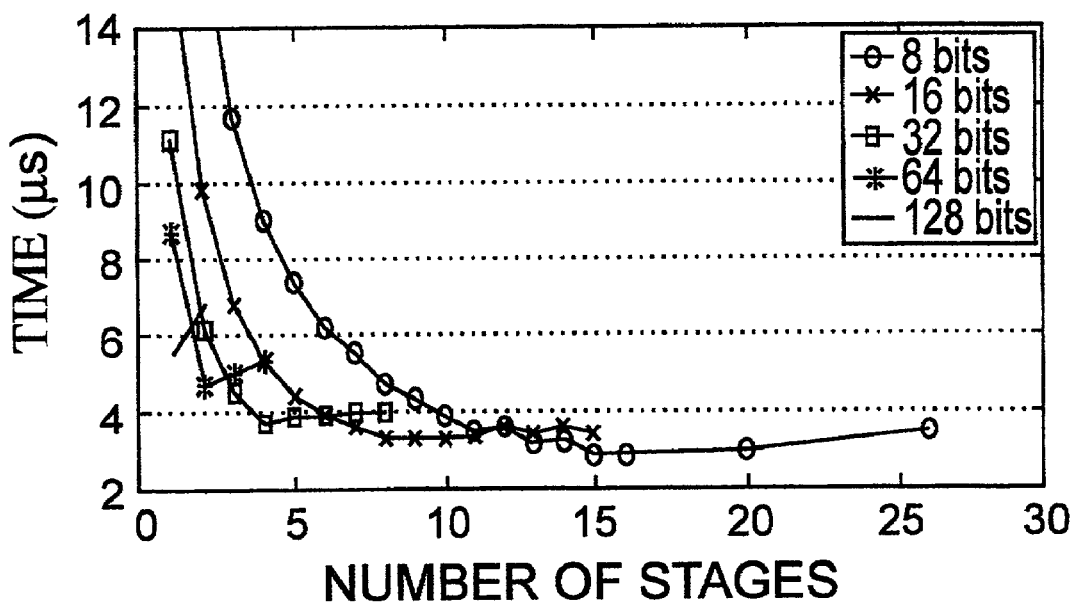
FIG. 6A is a graph illustrating execution time as a function of a number of stages for 8-bit, 16-bit, 32-bit, 64-bit, and 128-bit radix values for 256 bit operands.
Figure 6B:
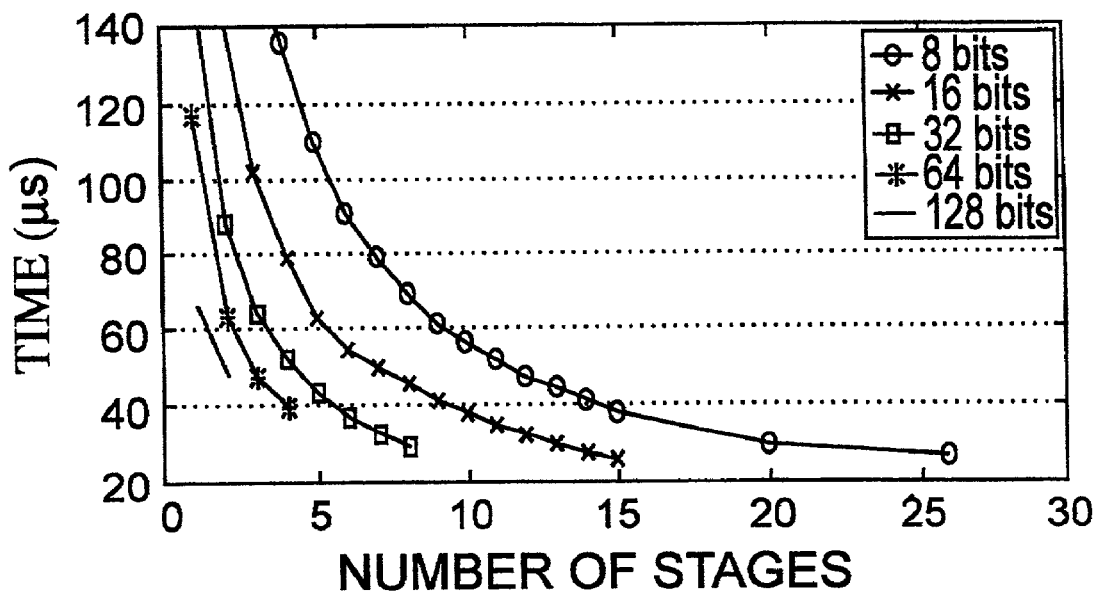
FIG. 6B is a graph illustrating execution time as a function of a number of stages for 8-bit, 16-bit, 32-bit, 64-bit, and 128-bit radix values for 1024 bit operands.

FIGS. 6A–6B are graphs of total computation time ($T_{CLK_s} \times t_p$) for N=256 and N=1024 as functions of number of stages NS and word size BPW. A first observed minimum computational time occurs for NW≦2*NS and NW>2*NS. With further increases in numbers of pipeline stages the computation time shows a series of minima and maxima. The boundary NW>2NS is crossed at a different number of stages for a different operand precisions (a different number of words). Operand precisions of 256 bits use a smaller number of stages in the pipeline than operands with 1024-bit precision in order to execute in a minimum time. The goal of choosing a design point is typically to have computation time for 256-bit precision close to an absolute minimum and at the same time to have as small a computation time for 1024-bit precision as possible.

It can be seen that the fastest designs are achieved with a word size of 8 bits. For this word size and 256-bit precision, the first optimal design point is for NS 15. The area is 14964 NOR gates. Each additional stage adds about 1005 to the gate count as can be obtained from the area equation. Other optimal points for this design, represented as NS/area pairs, are: 16/15969, 18/17979, 22/21999, 24/24009 and 26/26019. For 1024-bit precision, the time decreases asymptotically, with a faster decrease for a smaller number of stages.

TABLE 7

Design points for a radix-8 kernel, BPW = 8, N = 256 and N = 1024.

| NS | 15 | 16 | 18 | 22 | 24 | 26 |
|---|---|---|---|---|---|---|
| Area, gates | 14964 | 15969 | 17979 | 21999 | 24009 | 26019 |
| $\frac{t_{NS=15}}{t}$ for 256-bit | 1 | 1 | 1.05 | 1.04 | 0.92 | 0.83 |
| $\frac{t_{NS=15}}{t}$ for 1024-bit | 1 | 1.04 | 1.21 | 1.37 | 1.39 | 1.42 |

Table 7 compares several design points for the radix-8 kernel with BPW=8. It can be seen that the design point with NS=22 is very suitable since the computational time for 256-bit precision is very close to its minimal value. At the same time, the computational time for 1024-bit precision is improved by 37% as compared to the point with NS=15. With further increases in the number of stages, the computational time for 256-bit precision worsens while the computational time for 1024-bit precision does not improve significantly (only 2% per stage).

Figure 7:
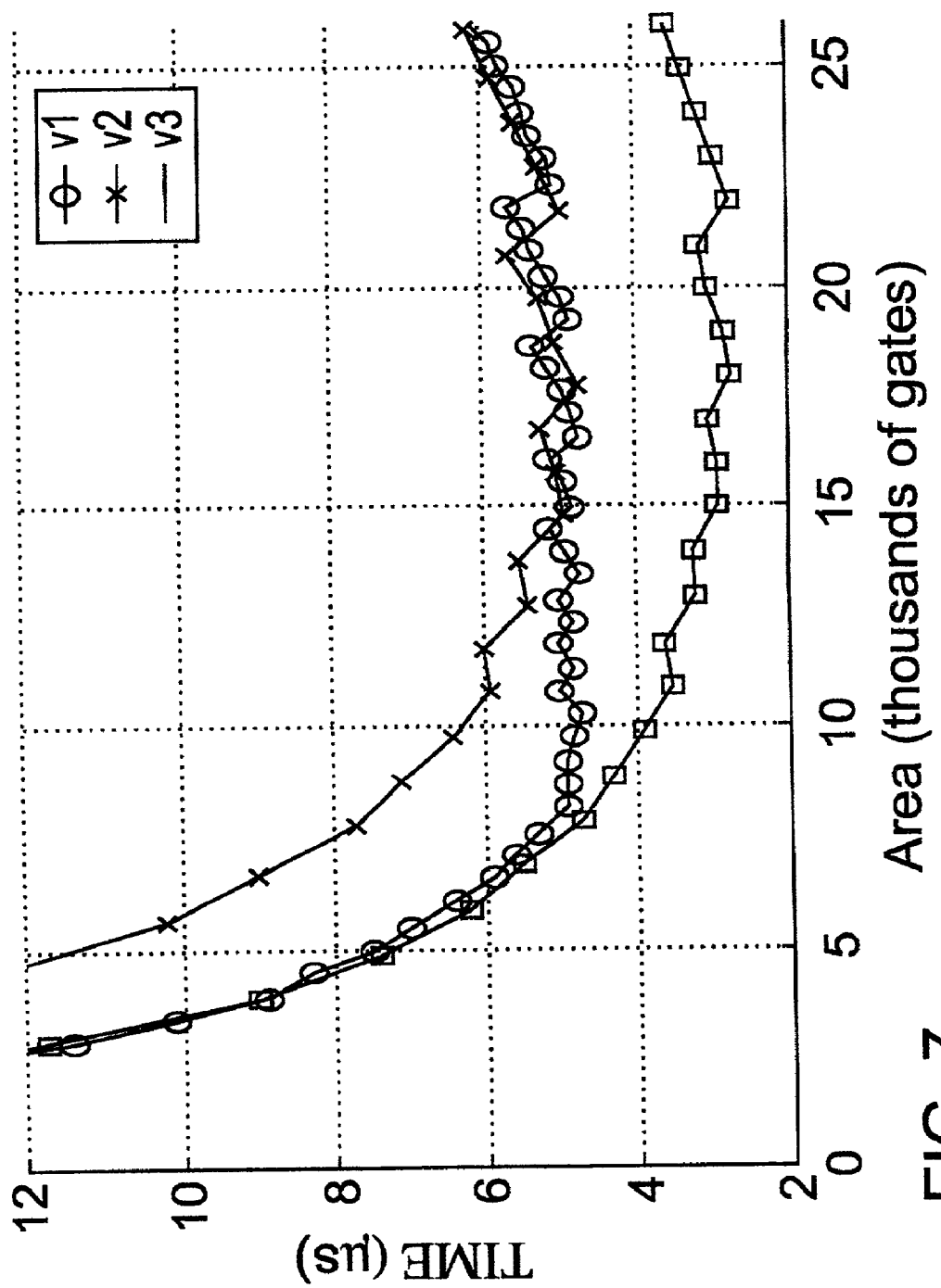
FIG. 7 is a graph illustrating processing time as a function of circuit area.

A performance comparison between a radix-2 design and radix-8 designs described above is shown in FIG. 7 that includes times required to compute a modular product for 256-bit operands as a function of circuit design area. For small areas, a radix-2 design (v1) performs as well as the re-timed radix-8 design, and the basic radix-8 design (v3) is inferior to the radix-2 design. For areas corresponding to about 10,000 or more gates, the re-timed radix-8 design is better than the other designs.

Examples are described above, but it will be understood that these examples can be modified in arrangement and detail. For example, methods and apparatus based on a radix of 8 were described but other values for the radix can be used. Re-timed configurations produce superior results, but methods that do not involve retiming can also be used. We claim all that is encompassed by the appended claims.

We claim:

1. A cryptographic method, comprising:
 (i) receiving a cryptographic parameter associated with a modulus based on a radix, and representing the cryptographic parameter as a multiplier operand;
 (ii) selecting a number of bits of the multiplier operand based on the radix and determining a Booth coefficient based on at least the selected bits of the multiplier operand;

(iii) processing the selected bits with a multiplicand and the modulus word by word to produce a partial product;
(iv) repeating stops (ii)–(iii) until all bits of the multiplier operand have been processed; and
(v) processing the partial product to obtain the Montgomery product.

2. A multiple-word, radix $r=2^k$ Montgomery multiplication method that produces a Montgomery product of cryptographic operands represented as a series of N bits, wherein k and N are integers, the method comprising:
(i) selecting k-bits of the first operand;
(ii) obtaining a Booth coefficient based on at least the selected k-bits;
(iii) establishing a value of a first carry bit and a word of an intermediate product based on the Booth coefficient, the intermediate product, and word of the second operand;
(iv) obtaining a modulus coefficient based on at least the selected k-bits;
(v) establishing a value of a second carry bit and the intermediate product based on the modulus coefficient, the intermediate product, and a word of the modulus;
(vi) processing the second operand and the modulus word by word to produce values of the first and second carry bits and words of the intermediate product;
(vii) repeating steps (i)–(vi) by selecting a next k-bits of the first operand until all bits of the first operand are processed; and
(viii) determining a final product based on the intermediate product.

3. A Montgomery multiplier, comprising:
word inputs configured to receive words of a modulus and a multiplicand operand;
a radix-digit input configured to receive a radix digit of a multiplier operand;
a kernel datapath configured to produce an intermediate product based on values delivered to the word inputs and the radix-digit input; and
a datapath configured to communicate a sum word and a carry word of the intermediate product.

4. The multiplier of claim 3, further comprising memory configured to store the sum word and the carry word.

5. The multiplier of claim 3, further comprising a final product processor configured to process the intermediate product and produce a Montgomery product of the multiplicand operand and the multiplier operand.

6. The multiplier of claim 3, further comprising a final product processor configured to process the intermediate product and produce a Montgomery product of the multiplicand operand and the multiplier operand.

7. The multiplier of claim 3, further comprising a Booth encoder configured to process the radix-digit of the multiplier operand.

8. The multiplier of claim 7, wherein the Booth encoder includes a lookup table.

9. The multiplier of claim 3, wherein the datapath is configured to communicate a word of the modulus.

10. The multiplier of claim 3, further comprising a carry datapath configured to propagate a carry value associated with the modulus and a carry value associated with at least one of the multiplier operand or the multiplicand operand.

11. A Montgomery multiplier circuit, comprising:
a kernel processor configured to process a first operand as radix digits and a second operand and a modulus as words;
a data path configured to determine successive values of a first carry bit and a second carry bit associated with processing successive words of the second operand and the modulus, respectively, and produce a carry-save representation of an unreduced Montgomery product; and
a reduction module configured to process the carry-save representation and produce a Montgomery product.

* * * * *